US009547163B2

(12) United States Patent
Liu et al.

(10) Patent No.: US 9,547,163 B2
(45) Date of Patent: Jan. 17, 2017

(54) Z-MICROSCOPY

(71) Applicants: Zhiwen Liu, State College, PA (US); Chuan Yang, State College, PA (US); Kebin Shi, Beijing (CN); Mingda Zhou, State College, PA (US); Siyang Zheng, State College, PA (US); Shizhuo Yin, State College, PA (US)

(72) Inventors: Zhiwen Liu, State College, PA (US); Chuan Yang, State College, PA (US); Kebin Shi, Beijing (CN); Mingda Zhou, State College, PA (US); Siyang Zheng, State College, PA (US); Shizhuo Yin, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 343 days.

(21) Appl. No.: 14/093,188

(22) Filed: Nov. 29, 2013

(65) Prior Publication Data

US 2014/0146159 A1 May 29, 2014

Related U.S. Application Data

(60) Provisional application No. 61/730,701, filed on Nov. 28, 2012.

(51) Int. Cl.
*G02B 21/36* (2006.01)
*G02B 21/00* (2006.01)

(52) U.S. Cl.
CPC .......... *G02B 21/008* (2013.01); *G02B 21/006* (2013.01)

(58) Field of Classification Search
CPC ..................... G02B 21/006; G02B 21/008
See application file for complete search history.

(56) References Cited

U.S. PATENT DOCUMENTS

| 5,013,150 | A | * | 5/1991 | Watts | G01N 21/8507 |
| | | | | | 250/227.11 |
| 5,445,011 | A | * | 8/1995 | Ghislain | B82Y 35/00 |
| | | | | | 250/307 |
| 5,932,871 | A | * | 8/1999 | Nakagawa | G02B 21/0048 |
| | | | | | 250/201.3 |
| 2002/0192808 | A1 | * | 12/2002 | Gambini | G01N 21/274 |
| | | | | | 435/287.2 |
| 2003/0119275 | A1 | | 6/2003 | Dewa et al. | |
| 2006/0027884 | A1 | | 2/2006 | Melzak et al. | |

(Continued)

OTHER PUBLICATIONS

International Report on Patentability and Written Opinion of the International Searching Authority for PCT/US2013/072466 mailed Jun. 11, 2015.

*Primary Examiner* — Dave Czekaj
*Assistant Examiner* — Md Haque
(74) *Attorney, Agent, or Firm* — Buchanan Ingersoll & Rooney PC (57) ABSTRACT

We present a method for parallel axial imaging, or z-microscopy, utilizing an array of tilted micro mirrors arranged along the axial direction. Image signals emitted from different axial positions can be orthogonally reflected by the corresponding micro mirrors and spatially separated for parallel detection, essentially converting the more challenging axial imaging to a lateral imaging problem. Each micro mirror also provides optical sectioning capability due to its finite dimension.

16 Claims, 7 Drawing Sheets

(56) References Cited

U.S. PATENT DOCUMENTS

| | | | |
|---|---|---|---|
| 2006/0274278 A1* | 12/2006 | Lee | G03B 21/2013 |
| | | | 353/53 |
| 2007/0243662 A1 | 10/2007 | Johnson et al. | |
| 2007/0279733 A1 | 12/2007 | Sander | |
| 2008/0151345 A1 | 6/2008 | Zhou | |
| 2011/0103739 A1* | 5/2011 | Nishizawa | G02B 6/2931 |
| | | | 385/18 |
| 2011/0300490 A1* | 12/2011 | Rachet | G02B 21/0032 |
| | | | 430/322 |
| 2011/0310395 A1* | 12/2011 | Tsai | G01B 9/02091 |
| | | | 356/479 |
| 2012/0086949 A1 | 4/2012 | Gao et al. | |

\* cited by examiner

Z-MICROSCOPY

CROSS-REFERENCE TO RELATED APPLICATIONS

This application claims priority to U.S. Provisional Patent Application No. 61/730,701, filed on Nov. 28, 2012. That application is incorporated by reference herein.

STATEMENT REGARDING FEDERALLY SPONSORED RESEARCH OR DEVELOPMENT

This invention was made with government support under Grant No. DBI0649866, awarded by the National Science Foundation. The government has certain rights in the invention.

BACKGROUND OF THE INVENTION

There exists a conspicuous disparity in the lateral (i.e., x, y) and axial (i.e., z) imaging speed in conventional optical microscopy. While an image at the x-y plane can be routinely acquired in parallel or at high speed, slow mechanical scanning of the objective lens or the specimen itself is typically required in the z direction for axial imaging. This hinders the ability to image fast processes in the axial direction.

Laser scanning optical microscopy, such as multi-photon and confocal microscopy, has become a widely used imaging modality due to its unique optical sectioning capability. However, slow scanning, particularly in the axial (or z) direction remains a hindrance. This typically requires mechanical axial scanning of the specimen or the excitation objective lens, limiting the z-imaging speed and hence the ability to visualize fast dynamic processes in the axial slice plane and overall in the three dimensions.

In an effort to address this challenge, multi-focal imaging has been investigated in wide-field microscopy by using multiple cameras with each placed at a different distance to image a different conjugate plane. Holography has also been applied to fluorescence microscopy to achieve three-dimensional imaging. However, these techniques lack optical sectioning capability.

Methods to achieve multi-focal imaging in scanning microscopy include time and wavelength division multiplexing. In a one-time division multiplexing technique, two sequences of excitation pulses with different wave-front divergence (thereby to focus on two different depth positions) are interleaved in time. The fluorescence signal generated at the two depth positions can then be de-multiplexed in time to realize bi-focal imaging. In epi-reflection chromatic confocal microscopy different wavelengths of a broadband source are focused onto different axial positions inside a specimen through purposely-introduced chromatic aberration. Light reflected from different axial positions has different wavelengths and can therefore be detected in parallel by using a spectrometer.

This method has also been extended to second harmonic microscopy, in which different fundamental wavelengths of a pump pulse are focused to different axial positions to produce second harmonic signals of different center wavelengths that can be simultaneously detected. However, parallel z-imaging has yet to be realized using wavelength division multiplexing in scanning fluorescence microscopy, one of the most widely used imaging modalities. Although chromatic scanning can be utilized to accomplish effective axial scanning, the fluorescence signals excited at different axial positions exhibit similar emission spectra, preventing the use of parallel spectroscopic detection.

BRIEF SUMMARY OF THE INVENTION

Our method for parallel axial imaging, or z-microscopy, utilizes an array of tilted micro mirrors arranged along an axial direction of a probe. Typically the micro mirrors are placed at an angle of 45 degrees with respect to the axial direction, though they may be varied as desired. Image signals emitted from different axial positions can be orthogonally reflected by corresponding micromirrors and spatially separated for parallel detection, essentially converting the more challenging axial imaging to a lateral imaging problem. Each micro mirror also provides optical sectioning capability due to its finite dimension. Numerical analysis shows that nearly diffraction limited axial resolution can be achieved.

Use of these mirrors exploits the differences in the wavefronts of emitters at different axial positions, which can be de-multiplexed by using a micro-mirror array (MMA). As a result, the image signals (e.g., fluorescence) excited at a series of depth positions are mapped onto a detector array for parallel detection. Detector arrays may be selected from among those known to people skilled in the art, including complementary metal-oxide-semiconductor (CMOS) or charge-coupled device (CCD) imagers. These may include, for example, electron-multiplying or liquid nitrogen cooled CCD cameras. In applications for 1D axial imaging a linear detector array can be used.

In a preferred embodiment, image signals generated in a specimen are focused onto an MMA, in which each micro mirror is tilted at 45° with respect to the axial direction. Note that strong diffraction of a converging wave only happens near its focus, where effective interaction with the micro mirror can occur. Consequently, each micro mirror behaves effectively as a confocal pinhole or slit, providing optical sectioning capability. After being reflected by the corresponding micro mirrors and subsequently imaged by a lens, the image signals from different axial positions can be detected in parallel by using a detector array.

Typically images may be generated by calibrating the depth-mirror relationship, then preparing the images in a computer. Advanced sampling and processing techniques, including compressive sensing, may be used.

Embodiments may provide a method for parallel axial imaging along the depth/axial (z) direction of a microscopy sample, including directing a test signal to a microscopy sample having a dimension in the z-axis, generating a plurality of imaging signals from the test signal; focusing the imaging signals on a micro mirror array; demultiplexing the plurality of imaging signals through said micro mirror array; directing the demultiplexed plurality of imaging signals through a plurality of lenses; collecting said demultiplexed plurality of imaging signals; measuring the demultiplexed plurality of imaging signals; and obtaining the axial image or the axial slice image of the microscopy sample from the data.

The micro-mirror array includes a plurality of angled mirrors. The plurality of mirrors is typically angled at 45 degrees with respect to the axial direction, though of variation of plus or minus 1 degree is not unusual.

A number of means for signal generation may be used. They include, for example, but are not limited to a fluorescence imaging signal, a multi-photon excitation fluorescence signal, harmonic signal, Raman signal, light emission signal, and scattered signal.

A further embodiment includes a device for analysis of the z-axis dimension of a sample, including a means for generation of a detection signal as discussed above. The means for generation of a detecting signal is directed to a sample, generating a detecting signal, and at least one collection lens is disposed to focus said detecting signal on a micromirror array. The device further includes at least one detection lens able to focus said detecting signal from said micromirror array; and it may include at least one detector array disposed to detect said detecting signal from said detection lens. Detection lenses may, for example, have a large enough numerical aperture to efficiently collect the signals reflected by the micro-mirrors, and large enough field of view to capture the signals from all the micro-mirrors in the desired axial imaging range.

The device's micromirror array may include a plurality of mirrors angled at 45 degrees relative to the axial direction of a sample to be tested by the device. The means for generation of a detection signal may be selected from the group consisting of fluorescence microscopy, confocal microscopy, multi-photon excitation fluorescence microscopy, photoluminescence, light emission, light scattering, harmonic generation microscopy, and Raman microscopy.

Embodiments may include one excitation lens is a Fresnel lens.

Other embodiments provide methods for axial slice light sheet imaging (e.g., in an x and z plane) of a specimen, including subjecting a specimen to a line of excitation beam to generate image signals, imaging the signals onto a plurality of micro mirrors arrayed at an angle relative to the axial direction, de-multiplexing the signals; detecting the de-multiplexed signals; and outputting the detected de-multiplexed signals as a slice plane image of the specimen. Typically the micro mirrors are arrayed at an angle of 45 degrees relative to the axial direction of imaging.

Embodiments may also provide a method for fabrication of a mirror for a micro mirror array for a z-microscopy device, though of course the methods and apparatus discussed herein do not require any particular method of fabrication unless so stated in the claims. An exemplary method includes coating a silicon wafer with an adhesive layer; spin coating the wafer with a photoresist, patterning the wafer; separating the wafer into a plurality of smaller wafers; developing at least one of the smaller wafers until said smaller wafers contain substantially no observable photoresist; and coating the at least one smaller wafer with a reflective material, thereby providing a micro mirror.

In such a method the adhesive layer may be, but is not limited to, hexamethyldisiloxane. One may vary the height of the micro mirror by varying the thickness of the photoresist. The reflective material that is used may be aluminum, which may, for example, be applied by sputtering. In some embodiments the line of excitation beam is prepared by a member of the group consisting of scanning a beam with a chromatically extended depth of focus, scanning a Bessel beam, focusing a beam with a cylindrical lens, scanning a beam with a chromatically extended depth of focus produced with a Fresnel lens, and scanning an Airy beam.

In one embodiment of the invention, the micro-mirrors have a high aspect ratio. Use of a high aspect ratio allows for axial slice light sheet imaging (e.g., in an x and z plane). High aspect ratio micro-mirrors may have a height to width ratio, for example, of 10-500 microns high to one micron wide. In a preferred embodiment the height to width ratio is 100:1. The height of the micro-mirror will determine the field of view in one transverse direction (e.g., x direction), while the number of micro-mirrors in the array and their distances will determine the field of view in the axial (z) direction.

DETAILED DESCRIPTION OF THE INVENTION

Embodiments of the invention relate to a new method for parallel axial imaging, also known as z-microscopy. We use a micro mirror array to de-multiplex image signals generated at different axial positions. Numerical analysis of the impulse response of the proposed imaging system validates the z-microscopy concept. The technique can be applied to multiple imaging modalities, including one-photon or multi-photon fluorescence microscopy, harmonic microscopy, confocal microscopy, and plane illumination light sheet microscopy. The vertical dimension of the micro mirror array can be further exploited to image a two-dimensional (2D) axial slice. The method can be particularly useful for studying fast phenomena in the axial direction and in three dimensions. As an example, later in this disclosure we demonstrate Z-imaging of multiple microspheres located at different axial positions.

Figure 1:
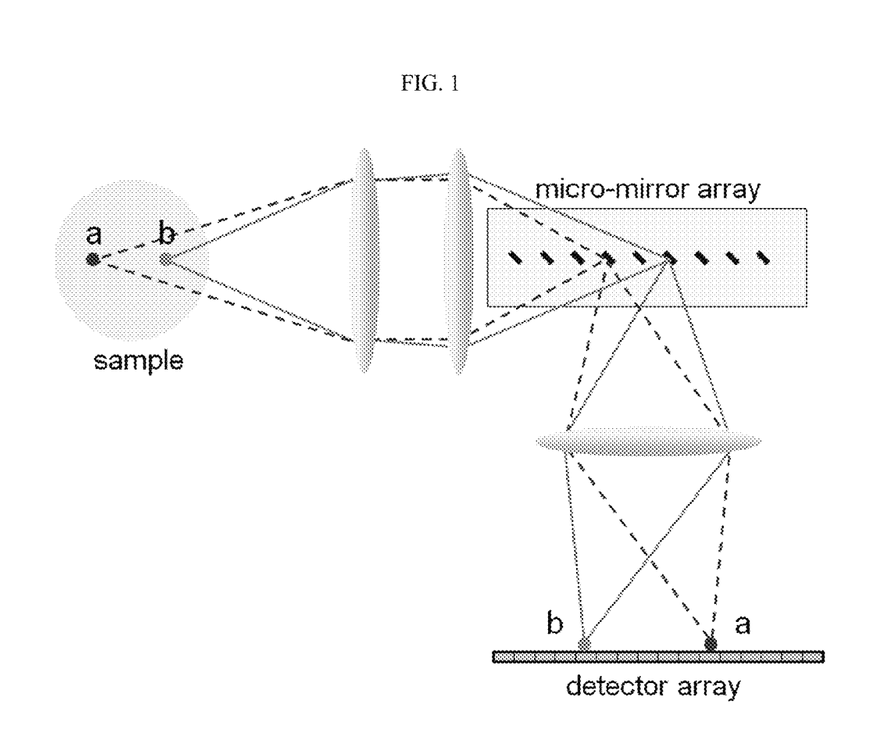
FIG. 1 is a schematic diagram illustrating the principle of z-microscopy as reported herein.
Figure 2:
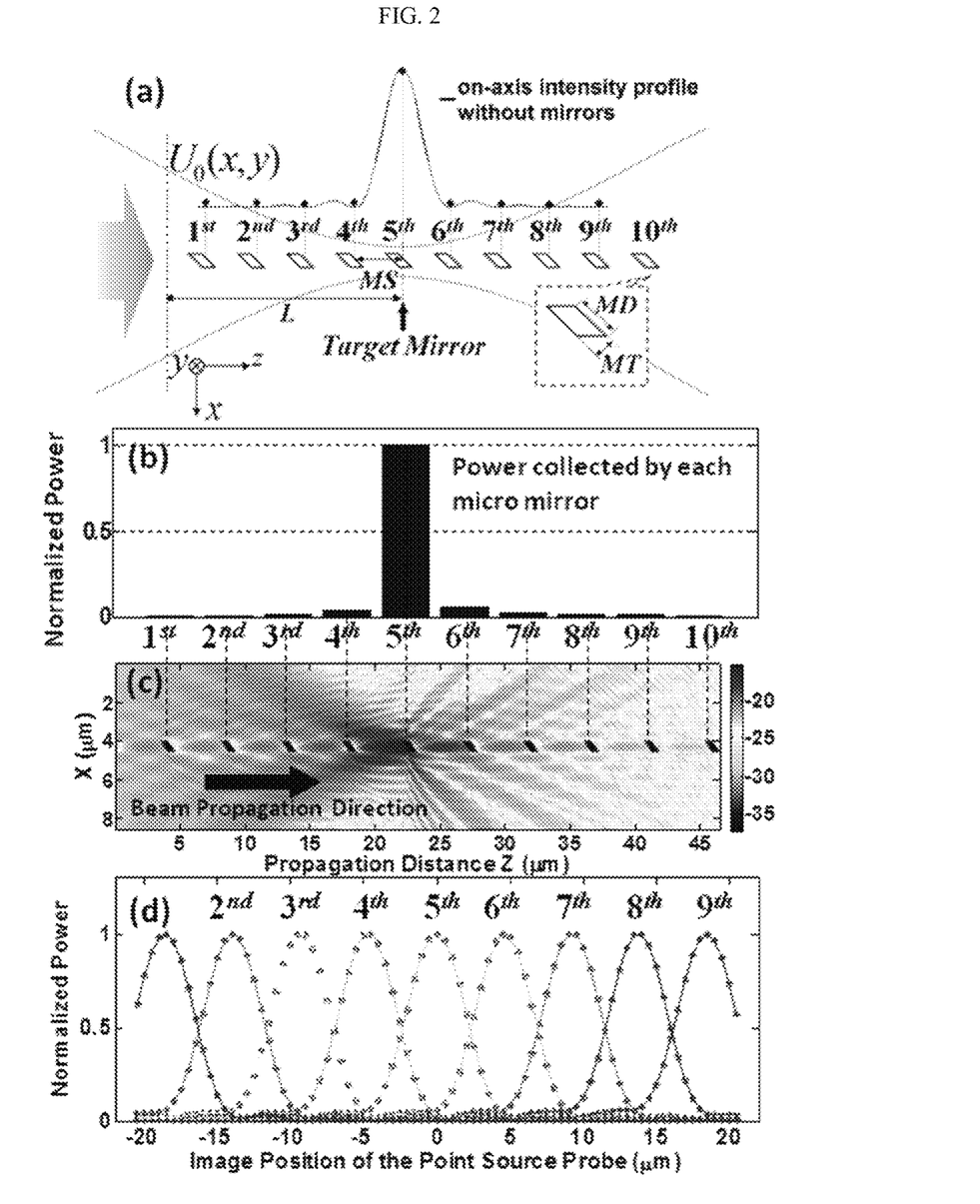
FIG. 2, including parts (a) through (d), shows a numerical analysis of the system impulse response.

To illustrate the demultiplexing concept, the diffraction of a converging wave by an array of micro-mirrors is analyzed. FIG. 1 is a schematic diagram illustrating the principle of z-microscopy. FIG. 2 shows numerical analysis of the system impulse response, wherein FIG. 2(a) is a schematic diagram of the simulation model: a converging wave is diffracted by an array of ten micro mirrors. FIG. 2(b) shows the normalized power collected by each micro mirror when a converging beam is focused on the target mirror (i.e., the 5th micro mirror).

FIG. 2(c) shows the intensity distribution (in logarithmic scale) in the x-z axial slice plane showing the diffraction of a converging beam by the micro mirror array. Strong diffraction occurs at the target mirror (5th mirror) where the beam is focused. Although a ten-mirror embodiment is shown, it will be understood that is possible to vary the number of mirrors. For example, embodiments may include 10-1000 mirrors, 100-500 mirrors, or 500-1000 mirrors. The number of mirrors used will depend on the axial imaging range, which can vary from tens of microns to hundreds of microns.

The type, shape, and dimension of mirrors may vary, but they should be commensurate with the diffraction-limited resolution. Mirrors that are too small will have a low light collection efficiency. Mirrors that are too large will have reduced resolution. For axial slice light-sheet imaging, a high aspect ratio mirror is used. In our analysis, the reflected wave is not tracked in the calculation and is assumed to be completely detected. FIG. 2(d) shows a simulated impulse response, wherein the horizontal axis denotes the position at which the probe beam is focused (i.e., the geometric image position of the point source probe) while the vertical axis represents the normalized power detected by each detector. Each curve corresponds to the response of a different detector.

Under the paraxial approximation the axial intensity distribution near the focal point of a lens is given by $$I(z) \propto \mathrm{sinc}^2\left(\frac{z}{2\lambda/NA^2}\right)$$

as shown in the upper curve of FIG. 2(a), where NA denotes the numerical aperture of the lens, $\lambda$ is the wavelength, and z is the on-axis distance from the focal point. Let us consider that one of the mirrors, i.e., the target mirror, is located at the peak position (i.e., the focal point) while the rest are located at the null positions of the intensity distribution, corresponding to a mirror separation of $MS=2\lambda/NA^2$ as depicted in FIG. 2(a). The beam propagation method was used to simulate the diffraction of a focused beam by an array of ten micro mirrors with square apertures. The calculated intensity distribution of the forward propagating beam in the x-z plane is shown in FIG. 2(c) in the logarithmic scale. The power collected by each mirror (normalized to the power collected by the target mirror) is obtained and shown in the bar chart of FIG. 2(b).

The existence of crosstalk can reduce the bandwidth of the imaging system hence the axial spatial resolution. Based on the simulation, the cross talk is low (total power detected by the other non-target mirrors <12%) and is mainly caused by the neighboring mirrors. To further analyze the axial resolution, an impulse response of the system h(n,z) is defined as the detected power at the nth detector (corresponding to the $n^{th}$ micro-mirror located at position $z_n$) when the geometric image of a point source probe is located at the axial position z. In the asymptotic case where the size of each micro-mirror is much smaller than the wavelength and the diffraction effect is weak, we can assume that the axial intensity distribution is largely unperturbed by the mirrors. Under this assumption and the paraxial approximation, the impulse response is given by $$h(n, z) \propto \mathrm{sinc}^2\left(\frac{z-z_n}{2\lambda/NA^2}\right),$$

indicating that the system behaves as a low-pass triangular filter with a bandwidth of $NA^2/2\lambda$. According to the Nyquist-Shannon sampling theorem, if the micro mirror spacing, i.e., the sampling period, is smaller than half of the inverse of the bandwidth, reconstruction with diffraction-limited axial resolution can be accomplished.

FIG. 2(d) shows a simulated impulse response of the system with the ten micro mirrors. The horizontal axis denotes the position at which the probe beam is focused (i.e., the geometric image position of the point source probe) while the vertical axis represents the normalized power detected by each detector. Each curve corresponds to the response of a different detector. It can be seen that the full width at half maximum of each curve is approximately equal to the mirror spacing, i.e., $2\lambda/NA^2$. This numerical analysis therefore validates the proposed z-microscopy concept, and indicates that it can potentially achieve nearly diffraction limited axial resolution (e.g., $\sim 4\lambda/NA^2$ in the above example).

Numeric Analysis—A numerical aperture NA=0.42 and a wavelength $\lambda$=410 nm are used in the exemplary calculations as presented herein. Those of skill in the art will recognize, with the benefit of this disclosure, that these parameters can be varied; for example, the numerical aperture can be as high as 0.9 for dry objective imaging. The wavelength will depend on the fluorophore used. The micro mirrors are within the depth of field of the lens that images the signal reflected from the micro mirrors onto the detector. Typically the micro mirrors are 45° tilted or tilted at approximately 45° with respect to the z-axis and have a parallelogram cross-section in the x-z plane (cf. FIG. 3(b)). Other cross-sections are possible.

The width of each mirror MD is set to $0.61\lambda/NA$ for the exemplary embodiment. Typically the width of the mirror should match the diffraction-limited resolution. It can be smaller but light collection efficiency will be reduced. It can be larger but the resolution will be reduced. The thickness of the micro mirror MT is chosen to be one half of its width (c.f., the inset of FIG. 2(a)). Thinner micro mirrors may be used. The smaller the thickness the better as it can introduce less perturbation. The field at the input plane is given by $$U_0(x, y) = \int_{\sqrt{f_x^2+f_y^2} \leq \frac{NA}{\lambda}} \int df_x df_y e^{i2\pi(f_x x+f_y y)} e^{-i2\pi L\sqrt{\left(\frac{1}{\lambda}\right)^2-f_x^2-f_y^2}}, \quad (1)$$

which represents a converging wave focused (in free space) at a distance L behind the input plane. The computation region (between the input plane and the output plane located immediately after the last mirror) is then divided into 2000 slices along the z-axis with a uniform step $\Delta z \sim 23$ nm. The propagation of the field from the n−$1^{th}$ plane to the $n^{th}$ plane is governed by the following equation:

$$U_n(x, y) = \qquad (2)$$
$$IFT\left\{FT[U_{n-1}(x, y)] \times \exp\left(i2\pi\sqrt{\frac{1}{\lambda^2}-f_x^2-f_y^2}\cdot\Delta z\right)\right\} \times P_n(x, y)$$

where FT stands for the two-dimensional (2D) Fourier transform, IFT represents the 2D inverse Fourier transform, and $P_n(x,y)$ is the aperture function (equal to 1 in free space). Each micro mirror is modeled as a staircase stack of rectangular apertures. The field inside the aperture is set to zero (i.e., assumed to be completely reflected off the beam propagation direction) and the power removed is accounted as part of the total detected power of the micro mirror. In our analysis, the reflected wave is not tracked and assumed to be completely detected by an array of corresponding detectors.

Fabrication of a micro mirror array—Hexamethyldisiloxane was first spin coated on a single-polished 4-inch (100) oriented silicon wafer to serve as the adhesive layer. A layer of KMPR 1010 (Micro Chem) negative photoresist was then spin coated and baked at 100° C. for 7 minutes. The height of the micro mirrors is determined by the thickness of the photoresist, which is controlled by adjusting the spinning speed. The wafer was then patterned by lithography, followed by 3 minutes' post-exposure baking at 100° C. The sample was diced before development to minimize the shear stress that the micro mirrors would otherwise suffer. Each individual device was then developed with CD26 developer until no photoresist residual was observed. The developed device in the preferred embodiment was then coated with 200-nm-thick aluminum in a sputtering system to enhance its reflectivity.

Imaging System—The laser output from a mode-locked femtosecond laser was expanded and focused with a Fresnel lens (design wavelength: $\lambda_0$=821 nm, design focal length: $f_0$=100 mm). In some embodiments the wavelength may vary from 800-850 nm and the focal length between 90 and 110 mm, though other values are possible. In the exemplary embodiment as reported herein the Fresnel lens is used for excitation over an extended axial range through chromatic aberration. Other methods that can be used to achieve this kind of excitation include the use of Bessel beam, Airy beam, or by using a lens or cylindrical lens with proper depth of focus.

Since the focal length f of a Fresnel lens depends on the wavelength 2 and is given by the relation $\lambda f=\lambda_0 f_0$, different wavelengths of the femtosecond pulse were focused to different axial positions, resulting in a chromatically extended depth of focus. The beam was re-collimated with a lens. An objective OL (100×, Carl Zeiss Jena, Apochromat HI100/1.32) was subsequently utilized to focus it into a specimen to generate fluorescence within the chromatically extended depth of focus via two-photon excitation (cf. FIG. 4(b)). The epi-detected fluorescence signal was collected by the same objective OL, filtered by a dichroic mirror and a band-pass filter, and focused onto the MMA by a long-working-distance objective lens (Mitutoyo 20×LWD). The fluorescence signal generated at different axial positions was therefore imaged onto the corresponding micro-mirrors (cf. FIG. 4(c)), and mapped to different positions on a charge-coupled-device (CCD) camera (e.g., along the horizontal direction of the CCD) by using another objective lens (Mitutoyo 50×LWD). A line image can be obtained, representing the fluorescence signal along the axial positions.

Figure 3:
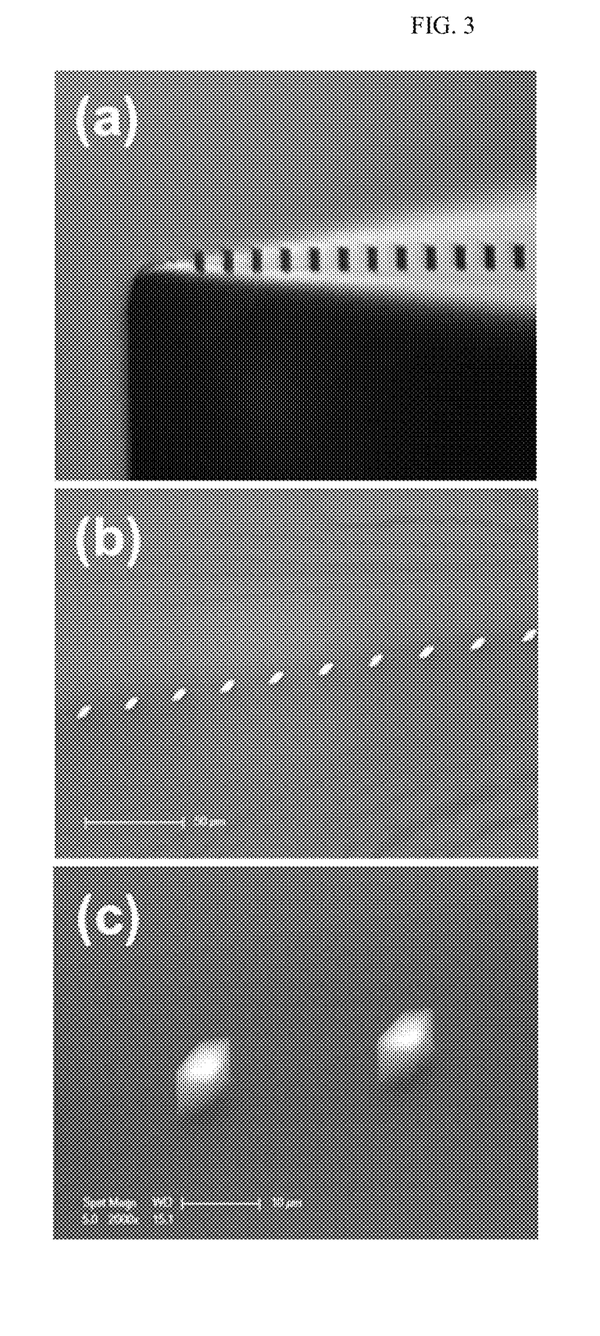
FIG. 3, including parts (a) through (c) shows a fabricated micro mirror array of one embodiment of the invention.

Example—Z-Imaging of Fluorescent Microspheres—To experimentally demonstrate the principle of z-microscopy, MMAs can be used that are fabricated using photolithography. FIG. 3 shows a fabricated micro mirror array, wherein FIG. 3(a) shows an optical microscope image of an array of micro mirrors standing on a silicon substrate. FIG. 3(b) shows the top view microscope (NIKON L200ND) image of the micro mirror array. The mirrors are tilted by 45° with respect to the light incidence direction. FIG. 3(c) is a scanning electron microscope (FEI Philips XL-20 SEM) image showing two adjacent micro mirrors.

FIG. 3(a) shows an optical micrograph of a fabricated MMA device. An array of micro mirrors standing on silicon substrate is present. A top-view optical microscope and a scanning electron microscope image is shown in FIG. 3(b) and FIG. 3(c), respectively. Each micro mirror has a dimension of 9.3 μm (width)×9.6 μm (height)×4.6 μm (thickness) and the distance between two neighboring mirror is 26.7 μm. These values are samples only and may be varied.

Figure 4:
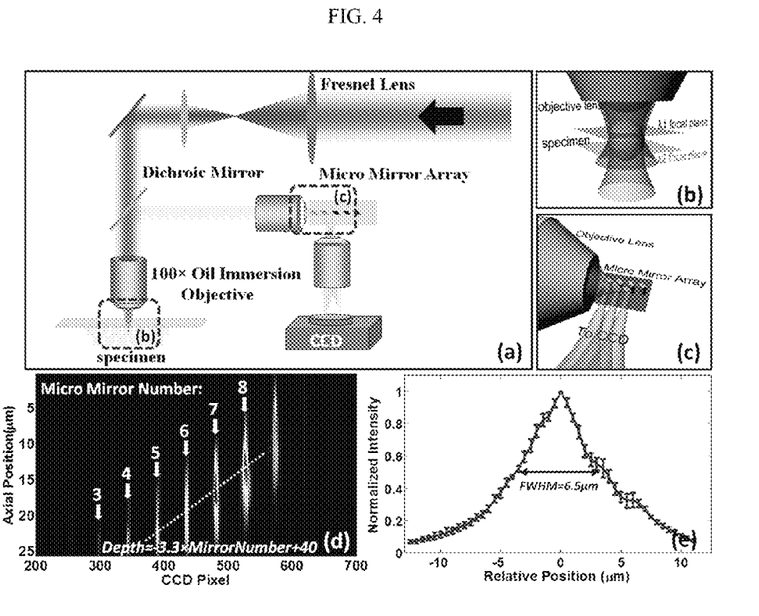
FIG. 4, including parts (a) through (e) shows a schematic diagram of the experimental setup and experimental data for one embodiment of the invention.

A z-microscopic imaging system was developed by incorporating the MMA device, as illustrated in FIGS. 4(a)-4(c). FIG. 4(a) is a schematic diagram of the experimental setup. FIG. 4(b) shows the chromatically extended depth of focus. Different wavelengths of the excitation pulse are focused to different axial positions due to purposely introduced chromatic aberration; FIG. 4(c) shows Z-imaging by using a micro mirror array. The micro mirrors are tilted at 45° with respect to the axial direction to de-multiplex fluorescence signals excited at different axial positions for parallel detection. FIG. 4(d) shows the depth response measured by scanning a 2-μm fluorescent microsphere along the axial direction.

Each row of the figure is a line image acquired when the microsphere probe was at an axial position specified by the vertical axis. The dotted line shows the calibrated depth position—mirror number mapping relationship, indicating an effective axial separation of about 3.3 μm in the sample space between two adjacent micro mirrors. FIG. 4(e) shows the normalized micro-mirror depth response averaged over multiple mirrors. The full width at half maximum of the response curve is approximately 6.5 μm.

In the system, two-photon fluorescent signal within a chromatically extended depth of focus can be excited and then demultiplexed by the MMA before being detected in parallel. To determine the depth response of the system, a single fluorescent microsphere with a diameter of 2 μm was placed near the focal point of the objective lens and scanned along the axial direction at a step size of 0.5 μm. A sequence of line images obtained at a series of axial positions is shown in FIG. 4(d). For each micro mirror, the corresponding axial position of the fluorescent microsphere probe which yielded the maximum signal was determined. The depth-mirror mapping relationship can then be obtained as depicted by the dotted line in FIG. 4(d). The calibration curve of the depth response can be fitted linearly with a slope of 3.3 μm/mirror number, indicating an effective axial separation of about 3.3 μm in the sample space between two adjacent micro mirrors. To demonstrate the z-imaging capability, multiple microspheres of diameter 10 μm were imaged by using the system.

Figure 5:
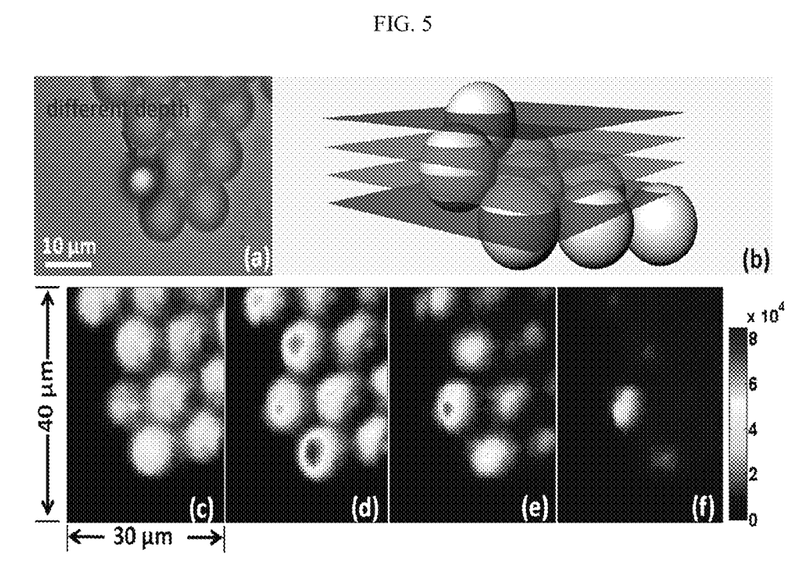
FIG. 5, including parts (a) through (f), shows Z-imaging experimental results.

FIG. 5 shows Z-imaging experimental results. FIG. 5(a) is a micrograph of a sample (e.g., multiple microspheres) used in the experiment. One microsphere is located at a very different depth level. FIG. 5(b) is an artistic schematic showing multiple axial planes simultaneously imaged by the micro mirror array. FIG. 5(c-f) show imaging results at four axial positions obtained by using the micro mirror array. Microspheres at different depths are resolved. The optical sectioning ability of the imaging system can be observed as the out-of-focus fluorescence signal is significantly suppressed (see FIG. 5(a) and FIG. 5(f)).

In the sample, one microsphere was located at a different depth position as indicated by the arrow in the micrograph of FIG. 5(a). The sample was scanned in the two horizontal ($\hat{x}$ and $\hat{y}$) directions with a step size of 0.5 μm. FIG. 5(b) shows a schematic figure illustrating the concept of multiple axial planes simultaneously imaged by the MMA. XY cross sectional images at four axial planes (corresponding to four adjacent micro mirrors, or equivalently, with an axial separation of ~3.3 μm) are shown in FIGS. 5(c-f). Microspheres at different depths are resolved. Compared with the wide-field image (cf. FIG. 5(a)), the out of focus fluorescence signal in FIG. 5(f) is significantly suppressed, demonstrating the optical sectioning ability of the imaging system.

Figure 6:
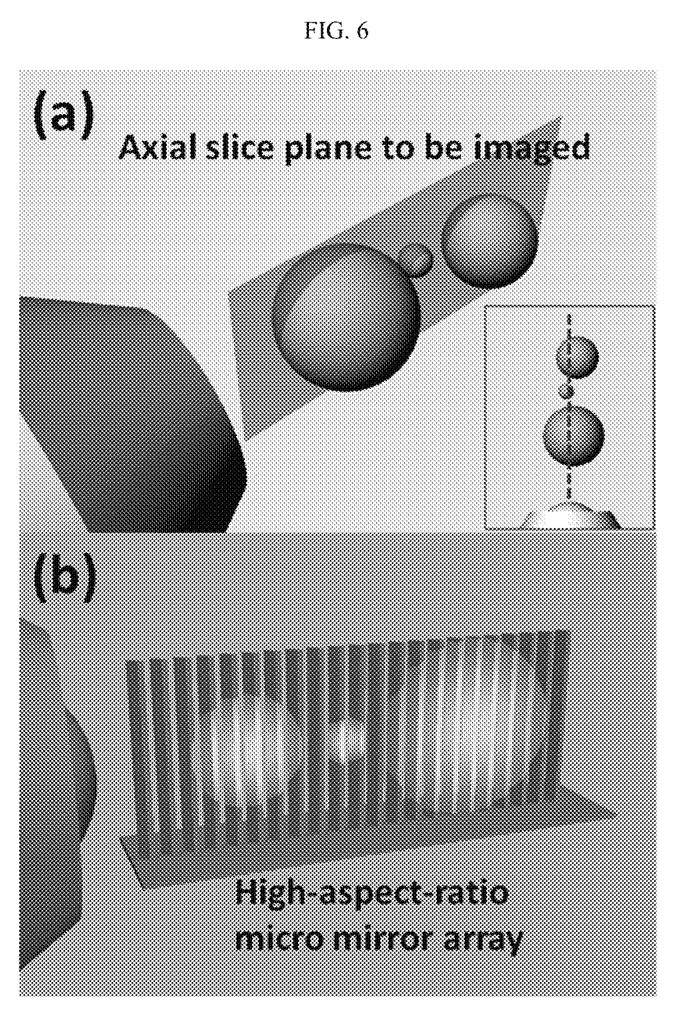
FIG. 6, including parts (a) and (b) shows two-dimensional (2D) axial slice imaging by using a high-aspect-ratio micro mirror array.

FIG. 6 shows two-dimensional (2D) axial slice light sheet imaging by using a high-aspect-ratio micro mirror array. As illustrated in FIG. 6(a), an axial slice of a specimen can be optically sectioned by employing a line of excitation beam. With a high-aspect-ratio MMA, a whole 2D axial slice can be imaged onto the micro mirrors, de-multiplexed and detected in a single shot by using a 2D imager (cf., FIG. 6(b)), potentially opening a new paradigm for axial slice light sheet microscopy which can alleviate the complexity associated with orthogonal illumination in other plane illumination or light-sheet microscopy based techniques.

As schematically shown in FIG. 6(a), an axial slice of a specimen is optically sectioned by a line of excitation beam. FIG. 6(b) shows the principle of axial slice imaging, wherein the 2D axial slice is imaged onto a high-aspect-ratio micro mirror array, de-multiplexed, and detected in parallel by using a 2D imaging array.

Further novel methods of fabrication of micro-mirrors are also provided herein, though as previously noted the scope of the claims for methods and devices as stated herein should not be limited to those including mirrors made by this or other methods unless stated in the claims. One embodiment uses micromolding, which is a low cost method for large surface array that can be easily adapted for mass production. Micromolding is suitable for structures with sizes down to at least ~10 nm and optical components like Fresnel zone plates and gratings.

Figure 7:
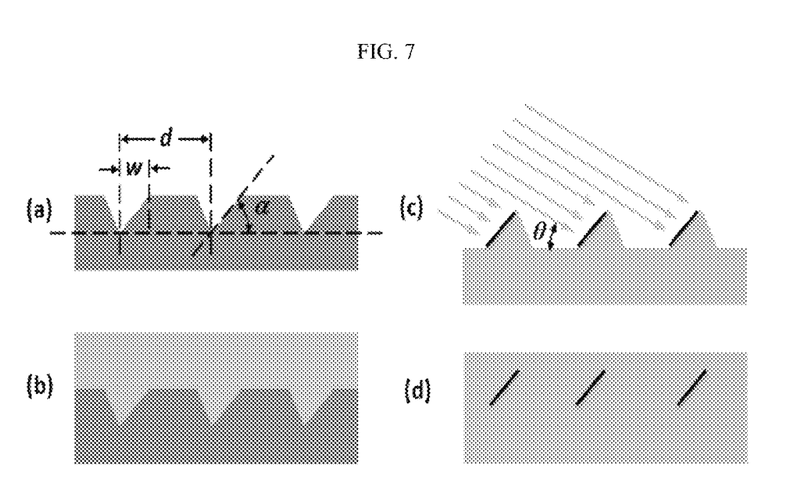
FIG. 7 shows a proposed fabrication process for a high aspect ratio mirror.

The high-aspect-ratio structure MMA may be made on a planar surface, as shown, for example, in FIG. 7. The mold may be generated by mechanically ruling with a diamond bit. The groove distance d, mirror width w and blaze angle $\alpha$ are important design parameters that may be set by the artisan with reference to this specification. For typical embodiments applications, $\alpha=45\pm1°$ is ideal.

The mold surface may be treated with (Tridecafluoro-1, 1,2,2-Tetrahydrooctyl)-1Trichlorosilane (United Chem. Tech.), which prepares the surface non-adherent for subsequent SU-8 epoxy based photoresist micromolding. 25 μm-thick SU-8 2025 (Microchem) may be spin coated onto the mold surface and cured (FIG. 7(b)). After releasing from the mold, 100 nm-thick Au may be deposited by e-beam evaporation from an oblique angle $\theta=\tan^{-1}(w \tan \alpha/d-w)$ (FIG. 7(c)). OmniCoat™ may be used as adhesion promoter to improve the adhesion between gold and Su-8 [32].

The directionality of e-beam metal deposition ensures gold is only coated on one side of the SU-8 structures. Finally another 25 μm-thick SU-8 may be spin coated and cured to flatten the surface and protect the Au layer (FIG. 7(d)).

Two alternative approaches may be used to modify the above method. First, one may use single crystal silicon wafers of custom cutting plane of 45° to silicon crystal plane and then use standard photolithography and anisotropic silicon wet etch to make the mold. This plane has a much slower etching rate and effectively will be the etch stop surface. Thus an atomic smooth surface can be fabricated. Alternatively, dose-modulated electron beam lithography can be used to make step structures with ~100 nm resolution, followed by thermal reflow of the resist to make a continuous slope.

Those of skill in the art will appreciate that while certain embodiments and aspects of the invention have been presented herein, variations of the invention within the scope of its teachings are contemplated. In addition, the following documents may be helpful in understanding certain embodiments of the invention (with the benefit of the foregoing specification), and they are incorporated by reference herein. This is not an admission that any listed document is prior art for any purpose. If any listed document is contradicted by the body of this specification, the body of this specification shall control.

We claim:

1. A method for parallel axial imaging along a depth/axial (z) direction of a microscopy sample, comprising:
    directing a test signal to a microscopy sample having an axial dimension along said depth/axial (z) direction;
    generating a plurality of imaging signals from said test signal, said plurality of imaging signals emitted from different axial positions along said depth/axial (z) direction;
    focusing said imaging signals on a micro mirror array to be reflected;
    demultiplexing said plurality of imaging signals through said micro mirror array;
    directing said demultiplexed plurality of imaging signals through a plurality of lenses;
    collecting said demultiplexed plurality of imaging signals;
    measuring said demultiplexed plurality of imaging signals; and
    obtaining an axial image or an axial slice image of said microscopy sample from the data;
    wherein said test signal is selected from at least one of fluorescence microscopy, confocal microscopy, multiphoton excitation fluorescence microscopy, photoluminescence, light emission, light scattering, harmonic generation microscopy, and Raman microscopy.

2. The method of claim 1, wherein said micro-mirror array includes a plurality of angled mirrors.

3. The method of claim 2, wherein said micro-mirror array includes a plurality of mirrors angled at 45 degrees with respect to the depth/axial (z) direction.

4. A device for axial imaging of a sample, comprising:
    a means for generation of at least one detecting signal, including at least one excitation lens, wherein said means for generation of said at least one detecting signal is able to be directed to a sample having an axial dimension along a depth/axial (z) direction, generating said at least one detecting signal from different axial positions along said depth/axial (z) direction;
    at least one collection lens disposed to focus said at least one detecting signal on a micromirror array to be orthogonally reflected therefrom;
    at least one detection lens able to focus said at least one detecting signal from said micromirror array; and
    at least one detector array disposed to detect said at least one detecting signal from said detection lens;
    wherein said means for generation of a detection signal is selected from at least one of fluorescence microscopy, confocal microscopy, multiphoton excitation fluorescence microscopy, photoluminescence, light emission, light scattering, harmonic generation microscopy, and Raman microscopy.

5. The device of claim 4, wherein said micromirror array comprises a plurality of mirrors angled at 45 degrees relative to the axial direction of a sample to be tested by the device.

6. The device of claim 4, wherein a Fresnel lens is used to achieve an excitation beam with chromatically extended depth of focus so that a plurality of image signals are generated along the axial direction.

7. The device of claim 4, wherein said micromirrors have an aspect ratio of height to width of at least 10:1.

8. A method for axial slice light sheet imaging of a specimen, comprising:
    subjecting a specimen to a line of excitation beam to generate image signals, said specimen having an axial dimension along a depth/axial (z) direction, said image signals being generated from different axial positions along said depth/axial (z) direction;
    imaging the signals onto a plurality of micro mirrors arrayed at an angle relative to the axial direction;
    de-multiplexing said signals;
    detecting the de-multiplexed signals; and outputting the detected de-multiplexed signals as a slice plane image of the specimen;

wherein the line of excitation beam is prepared by at least one of scanning a beam with a chromatically extended depth of focus, scanning a Bessel beam, focusing a beam with a cylindrical lens, scanning a beam with a chromatically extended depth of focus produced with a Fresnel lens, and scanning an Airy beam.

9. The method of claim 8, wherein said micro mirrors are arrayed at an angle of 45 degrees relative to said depth/axial (z) direction.

10. The method of claim 2, wherein said mirrors are angled at about 45 degrees.

11. The method of claim 1, further comprising excitation over an extended axial range through chromatic aberration.

12. The method of claim 8, further comprising introducing chromatic aberration via excitation over a chromatically extended axial range with a Fresnel lens.

13. The method of claim 8, wherein said image signals are fluorescent signals and said fluorescent signals are excited and demultiplexed before being detected.

14. The method of claim 8, wherein said at least one detecting signal is excited and demultiplexed within a chromatically extended axial range.

15. The method of claim 13, wherein said fluorescent signal is excited and demultiplexed within a chromatically extended axial range.

16. The method of claim 8, wherein said slice plane image of said specimen is a whole two dimensional axial slice performed by taking a single shot with a 2D imager.

* * * * *